Oct. 5, 1965 F. SCHUERMANN ETAL Re. 25,869

METHOD OF FIXING ANCHOR BOLTS IN THE DRILL HOLES

Original Filed May 2, 1960

INVENTORS
Fritz Schuermann
Rudolf Novotny
by Malcolm W. Fraser
attorney

United States Patent Office

Re. 25,869
Reissued Oct. 5, 1965

25,869

METHOD OF FIXING ANCHOR BOLTS IN THE DRILL HOLES

Fritz Schuermann, 20 Daimlerstrasse, Essen-Bredeney, Germany, and Rudolf Novotny, 22 Ostpreussenstrasse, Essen-Heisingen, Germany Original No. 3,108,443, dated Oct. 29, 1963, Ser. No. 26,005, May 2, 1960. Application for reissue Oct. 23, 1964, Ser. No. 420,471
Claims priority, application Germany July 7, 1959
5 Claims. (Cl. 61—45)

Figure 1:
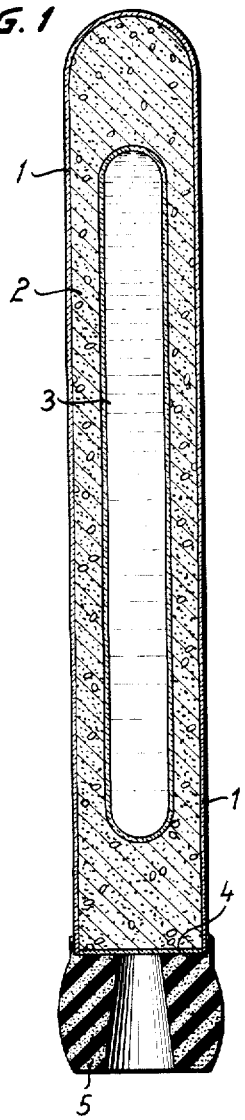

Matter enclosed in heavy brackets [ ] appears in the original patent but forms no part of this reissue specification; matter printed in italics indicates the additions made by reissue.

This invention relates to a method of fixing anchor bolts in the drill holes receiving them. Such anchor bolts are employed in the most varied fields of engineering, for example in the known method of lining mine openings and tunnels using anchor bolts, and also for making safe overhanging rock walls above ground, for numerous purposes in structural engineering, such as for reinforcing foundations etc., securing machines on such foundations, to provide facilities for mounting or attaching other parts on or to their outer ends, then formed as hooks and other equivalent purposes.

The loading respectively carrying capacity of such anchor bolts is determined by the efficiency with which their ends are secured in the inner end of the drill hole.

In the case of anchor bolts employed as supports for underground galleries their fixing in the inner ends of the drill holes is effected as a rule by mechanical spreading out the expandable bolt head by screwing or driving the shank of the bolt into the head and thereby bracing it against the wall of the drill hole. In the case, in particular, of drill holes made in soft rock in which an adequate grip of the bolt head cannot be obtained and also of drill holes made in particularly solid rock into which the expanding elements on the bolt head would be unable to penetrate to a sufficient extent, so that the bolt would "creep" under its continuous load, the end of the bolt shank is frequently cemented into the inner end of the drill hole.

Usually ordinary cement mortars are used for this purpose. In this method of fixing the anchors their head needs not to be expandable so that the diameter of the drill hole may be made substantially smaller than when anchors having expanding heads are used, the cutting work during the drilling operation being thereby considerably reduced.

The fixing of anchor bolts in the foregoing manner, which is very simple in the case of downwardly directed drill holes, which require filling with cement mortar only over a restricted part of their length, causes difficulties, however, in the case of upwardly directed drill holes. Such fixing then requires the use of the cement mortar in a very consistent state and entails driving in the anchor bolt immediately after the mortar has been introduced so that it is not possible in a first phase to fill a large number of drill holes with the mortar and subsequently to introduce the anchor bolts into them which is of course the more desirable procedure.

A further drawback common to all the known methods of cementing in the anchors is that the anchor bolt secured in the drill hole in this way becomes capable of supporting a load only after some considerable time which depends on the minimum setting time of the mortar, generally a few days. Only after this delay bracing of the bolt against the body of rock or the like can take place. This period can be shortened by employing known agents accelerating the setting action, but not less than 8 to 12 hours.

It has been proposed to employ instead of cement synthetic resins which are introduced in a fluid state into the inner end of the drill hole a capsule mounted on that end of the anchor bolt which is to be expanded. On expansion of the bolt the capsule is destroyed and the fluid synthetic resins escape, fill the space between the head of the anchor bolt and the wall of the drill hole and, so to speak, cement the bolt head to the rock after they have hardened. In this case, it is true, the drawback of the long hardening period of the cement mortar is obviated but the adhesive or holding effect obtainable is not satisfactory, in particular because of the shrinkage of the synthetic resin during its hardening, as a result of which the plastic substance becomes detached from the wall of the hole.

By means of the invention the foregoing disadvantages of the known methods of the type described are eliminated, i.e., rapidly effective anchoring of the bolt head is effected in the inner end of the drill hole in a manner which makes it possible to subject the bolt to an initial stress several times that heretofore considered reasonable. At the same time, as a further development of the basic idea of the invention, the steps necessary for the foregoing purpose are simplified and the amount of work entailed is reduced.

According to the invention a secure connection between the bolt head and the rock is obtained by means of a method of procedure as a result of which the material introduced into the inner end of the drill hole, preferably a synthetic resin having a shrinkage as small as possible on hardening, unfailingly penetrates into the crevices, fissures or cracks in the rock surrounding the drill hole and opening into the latter, fills them and forms indentations anchored therein.

According to one embodiment of the invention the foregoing result is obtained by pressing a synthetic resin in fluid form into the drill hole before the anchor bolt shank is introduced and the head of the anchor bolt is forced into the pressed-in synthetic resin material while it is still sufficiently soft.

Since this embodiment of the method according to the invention permits the application of high pressures during the forcing in of the fluid synthetic resin, such pressures being up to 100 atmospheres or more according to the rock conditions, said embodiment provides deep penetration of the synthetic resin into the crevices, cracks and fissures and thereby a particularly tenacious bond between the rock and the synthetic resin substance in which the head of the anchor bolt, which is smooth in itself and provided with suitable roughened portions or projections and depressions, is securely held.

For pressing in the synthetic resin in this embodiment of the invention a pipe is used which is inserted into the drill hole to about three-quarters of its length. An annular sealing element mounted on the pipe seals off the inner end of the drill hole which is to be filled with the synthetic resin from the remaining main part of the drill hole. In the event of molten synthetic resins being used the impregnating pipe may be electrically heated over its entire length or part thereof.

This embodiment of the method requires the use of auxiliary apparatus for generating the pressure and is applicable primarily where a particularly high tensile strength of the anchorage is important.

An anchoring which is in the most cases completely adequate for achieving the desired affect—filling all the hollow spaces in the deepest part of the drill hole, including the cracks and fissures opening into it, with the cementing-in material—can as a rule be obtained, according to a preferable embodiment of the method, by separately introducing the constituents through whose reaction with one another the solid anchoring body is formed into the inner end of the drill hole in different compartments of the cartridge, which cartridge is destroyed or squeezed out by driving in the end of the anchor bolt, which does not comprise an expanding head, thereby mixing the constituents with one another and forcing the mixture into the hollow spaces by further driving in, preferably rotating the anchor bolt, which may be provided for the purposes of exerting the pressure with continuous or discontinuous spiral ribs or projections extending around its periphery, in the opposite direction from that in which the anchor bolt is rotated during driving in. *It will be appreciated that the anchor bolt selected should preferably have radially extending ribs which terminate short of the walls of the drill hole.* This embodiment has the additional advantage that the introduction of the components of the substances from which the bond is formed and of the anchor bolt can be carried out completely independently of one another in respect of time.

The foregoing method may be carried into effect also using as bonding substances an inorganic cement mortar mixture, instead of, as is preferred, by forming it of a fluid synthetic resin and a hardening agent therefor.

As an example of a synthetic resin mixture suitable for the latter manner of carrying the method into effect there may be mentioned a mixture consisting of malelic acid ester, phthalic acid ester and styrene, using benzoyl peroxide as accelerator or hardener, to which mixture 60 to 80% of quartz powder or quartz sand is added. By excluding air such as a mixture is stable for some time.

It has been found to be particularly advantageous to use for the anchoring action and the rapid load-bearing action attainable, i.e., shortening of solidifying time of the material producing the bond between the rock and the anchor bolt, hardenable synthetic resins of special type, namely polyester resins of the kind known by the trade name of "Vestopal," or synthetic resins equivalent to them as regards their composition and properties, such as phenolic resins, melamine resins or polyurethanes, for example of the kind known by the trade names of "Desmophen" and "Desmodur," and if desired also epoxides, these being introduced into the inner end of the drill hole together with the hardening agents and/or accelerators accommodated in separate compartments of the cartridge and being mixed with the latter in the drill hole after the cartridge has been destroyed.

There are used as hardeners for the polyesters, peroxides such as cyclohexanone peroxide, benzoyl peroxide or methyl ethyl ketone peroxide and, as accelerators, dimethyl aniline or cobalt naphthenate, for example. There may be used as filters, the purpose of which in particular is to compensate the shrinkage or contraction of these synthetic resins which may possibly occur on hardening, quartz sand having a suitable grain size of 1 to 3 mm. or glass fibers, for example. If the cartridge consists of glass, as if preferably does, part of the function of the fillers is performed by the glass splinters, which are mixed with the synthetic resin material. The proportionate quantity of fillers added may be very high without impairing the properties of the mixture in use and, if required, amount to up to 80% of the latter, the result also being a corresponding reduction of the cost of the total mass, which then acquires a doughy character. If required, to diminish the shrinkage tendency during hardening, substances which give off gases on increase in temperature such as for instance, $NH_4HCO_3$, $NaHCO_3$, ammonium carbonate, azoisobutyric nitrite, terephthalic nitrosomethylamide, may moreover be added.

The above-mentioned additions may, of course, be used either singly or in combination.

A special feature of this manner of carrying the invention into effect is the choice of the ratio of the proportions of synthetic resin substance and hardener and also of accelerator. According to the invention a proportion of hardening agents of the order of 1 to 40% is used, while the proportion of accelerators is adjusted to an order of 0.2 to 10%. Under such conditions, by suitable choice of the materials to be admixed, the hardening time of the synthetic resin substance in the inner end of the drill hole can be adjusted within the wide time limits, from minutes to days, according to the conditions determined by the particular application.

Strength values of the anchorage can then be obtained which are so high that they exceed the tensile strength of the anchor bolt itself, i.e., when the anchor bolt is subjected to sufficiently high stresses the bolt shank breaks before its anchorage in the inner end of the drill hole becomes loosened.

Another possible method of influencing the hardening time, that is, accelerating the hardening process, which can be applied in addition or by itself, is to preheat the cartridge and/or the anchor bolt before they are introduced into the drill hole. The use of this step also makes it possible to employ resins which are not yet thoroughly hardened and are practically solid at room temperature.

Examples of this embodiment of the new method, in which various synthetic resins particularly suitable for carrying it into effect are used, are given hereunder.

EXAMPLE 1

A glass cylinder having a wall thickness of ½ mm., a length of 300 mm. and a diameter of 28 mm. was used as a cartridge. The cartridge was filled with a mixture consisting of 30% of Vestopal A, 70% of quartz sand and 8% of benzoyl peroxide. A glass capsule having a length of 280 mm. and a diameter of 9 mm., filled with Vestopal A with 2% of dimethyl aniline as accelerator, was introduced into the filling. The closed cartride provided with a sealing element was inserted in a drill hole having a diameter of 33 mm. and then the anchor bolt, formed with spiral ribs over its entire periphery, was driven into the drill-hole by rotating it at a speed of 100 to 240 turns per minute, whereby the cartridge was destroyed, the separate constituents were mixed with one another and the hardening process was initiated. After a screwing-in time of 30 seconds and a hardening time of 30 minutes, it was possible to subject the anchor bolt to a tensile load, an adhesion of 1.25 tons/cm. of cemented length being obtained.

EXAMPLE 2

A glass cylinder having the dimensions given in Example 1 pre-heated to 160° C. and filled with a mixture consisting of 40% of the ethoxylin resin (epoxy resin) known under the trade name "Araldite," the known castable resin E and 60% of quart powder was used as a cartridge. The second glass capsule, which contained 20% of amine hardener Type 943 (% referred to the Araldite cast resin), was embedded in this filling. The cartridge was introduced in a hot state into the drill hole, the anchor bolt formed with spiral ribs, which was heated to about the same temperature, was introduced into the drill hole by rotating it in the opposite direction from that of the spiral, the cartridge thereby destroyed and the constituents including the splinters of the glass cylinder were initimately mixed with each other. After 15 minutes the hardening process was completed. The testing of the adhesion or grip of the anchor bolt, which was carried out immediately gave a value of 1.70 tons/ cm. of cemented length.

EXAMPLE 3

A Bakelite cylinder having a wall thickness of 1 mm. was used as the outer cartridge and was filled with 40 parts of precondensed, viscous phenolic resin (P600) produced by Dynamit A. G., of Troisdorf, and 60 parts of quartz sand of different grain sizes. A capsule containing the hardener, namely, toluylsulphonic acid, was embedded in the filling. After the cartridge had been inserted into the drill hole, the anchor bolt pre-heated to about 200° C. was introduced rotating it into the drill hole thereby destroying the cartridge and intimately mixing the constituents with each other. After an hour the anchor bolt resisted to a load of 1.10 tons/cm. of cemented length.

EXAMPLE 4

A glass cylinder having a wall thickness of 1 mm., a length of 500 mm. and a diameter of 28 mm. which was filled with 30 parts of Vestopal A and 70 parts of ground slag + $NaHCO_3$ was used as a cartridge. Into this filling there were inserted another two glass cylinders having a diameter of only 8 mm., one of which contained 6% of benzoyl peroxide (% referred to Vestopal A), while the other contained Vestopal A mixed with 4% of dimethyl aniline. After the cartridge had been introduced into a drill hole having a diameter of 33 mm., the anchor bolt rotating at a speed of 300 turns per minute and carrying an elastic annular sealing element at a distance from the tip of the bolt corresponding to the length of the cartridge was driven into the drill hole and the cartridge was thereby destroyed, the constituents including the glass splinters being intimately mixed with each other. After a period of rotation of 60 seconds and a following hardening period of 40 minutes the bolt was subjected to tensile load; the adhesion corresponded to a load of 1.4 tons/cm. of cemented length.

The following table gives examples of resin mixtures which have proved to be particularly suitable for carrying the new method into effect.

Besides of a mortar prepared by using cement, it is also possible to employ a gypsum, lime or other mortar having hydraulic properties, the nature of the fillers being suitably altered if required.

The cartridges employed for these advantageous embodiments of the new method for the purpose of accommodating the constituents in compartments separated from one another and which may preferably consist of glass or if desired or synthetic resin or thin-walled metal, are advantageously formed with longitudinally directed weakening lines distributed over their peripheries at suitable points, which lines will determine the places at which the cartridge will burst open owing to the pressure of the anchor bolt. Moreover the cartridges may have peripheral ribs of elastic material arranged at suitable axial distances from one another, said ribs being applied resiliently against the wall of the drill hole and holding the charged cartridge in the drill hole until introduction of the anchor bolt is effected. Furthermore inwardly extending peripheral ribs may also be provided, at suitable distances along the length of the cartridge, said ribs being applied against the periphery of the anchor bolt penetrating into the cartridge and sealing off the contents of the cartridge section by section.

The cartridges may be divided into the compartments by means of longitudinal or of transverse walls arranged at axial intervals, each of the compartments containing one constituent of the mixture to be prepared or, for

| Temp. | Resin | Percent | Filler | Percent | Hardener [1] | Percent | Accelerator | Percent | Hardening time, mins. | Adhesion, tons/cm.[2] |
|---|---|---|---|---|---|---|---|---|---|---|
| 20 | Vestopal A | 40 | Quartz powder | 60 | BP | 8 | DMA | 1 | 30 | 1.05 |
| 20 | do | 30 | Quartz sand 1-2 mm. | 70 | BP | 8 | DMA | 1 | 30 | 1.25 |
| 20 | do | 30 | do | 70 | BP | 8 | DMA | 1 | 180 | 1.40 |
| 20 | do | 35 | do | 65 | BP | 8 | DMA | 2 | 30 | 1.30 |
| 20 | Vestopal H | 30 | do | 70 | BP | 8 | DMA | 1 | 30 | 1.20 |
| 20 | Araldite E | 40 | Quartz powder | 60 | Type 943 | 20 | | | 1,200 | 1.50 |
| 20 | do | 40 | do | 60 | Type 951 | 20 | | | 1,200 | 1.60 |
| 120 | do | 40 | do | 60 | Type 943 | 20 | | | 60 | 1.60 |
| 160 | do | 40 | Quartz | 60 | do | 20 | | | 15 | 1.70 |

BP=benzoyl peroxide.
DMA=dimethyl aniline.
[1] The concentration of hardener and accelerator refers to resin used.
[2] The adhesion (tons/cm.) refers to the cementing length of an anchor bolt fixed in the drill hole which is subjected to tensile load after the hardening times indicated.

Also if this embodiment of the new method is carried into effect using an inorganic cement as the bonding substance, the constituents of a cement mortar are introduced into the drill hole in separate compartments of the cartridge, in fundamentally the same way as has been described above in the case of synthetic resin, and their mixing, and thereby the preparation of the mortar is first carried out in the inner end of a drill hole under the simultaneous pressure effect occurring owing to the rotary driving in of the anchor bolt.

This embodiment of the method is preferably carried into effect in practice by putting into one compartment of the easily destructible cartridge a dry mortar, which needs not to be prepared at the place where it is to be used but can be dosed and mixed very carefully in the factory, and in another compartment the necessary quantity of water, to which as a rule an accelerator is added. The cartridge prepared in this way can be stored practically indefinitely in readiness for use.

In this case likewise, as the necessity for taking into consideration the fact that the mortar must remain useful for a fairly long time, that is, may not harden prematurely is avoided, the composition of the constituents and in particular also the nature and quantity of the accelerator employed can be chosen that after the constituents have been mixed with each other rapid hardening takes place and the anchor bolt is enabled to perform its supporting function in a correspondingly short time. The period of time required for this purpose may be shortened to one hour by using the conventional hardening agents, such as calcium chloride, in suitable amounts.

example, the liquid constituent of the mixture may also be accommodated in a glass container embedded centrally in the material filling the cylindrical cartridge and forming the other constituent.

The anchor bolt driven into the cartridge simultaneously rotating it preferably provided with spiral ribs extending in the direction opposite to that of rotation may advantageously be sealed off with respect to the walls of the drill hole at the near end of the cartridge by means of a sealing element penetrated by the anchor bolt and bearing against the said walls of the drill hole.

Figure 2:
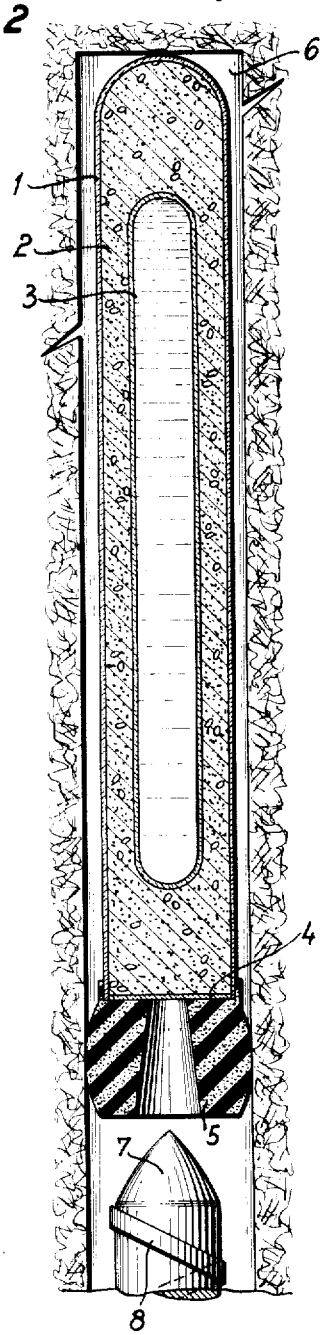
Figure 3:
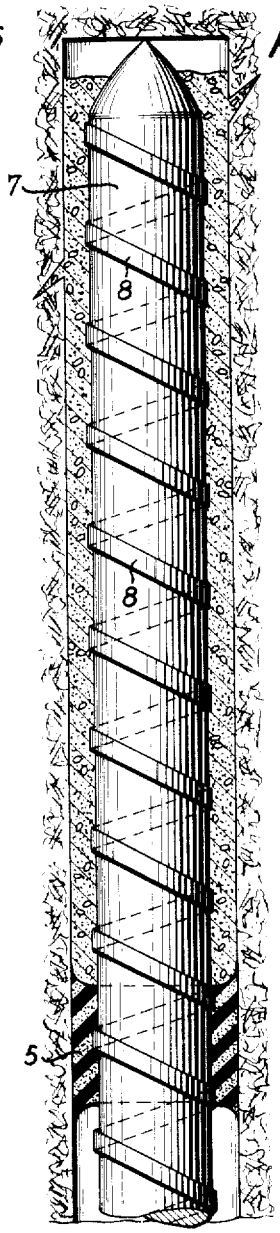

One constructural form of cartridge suitable for the most advantageous manner of carrying the new method into effect is shown in the accompanying drawings, in which:

FIGURE 1 is an axial section through the cartridge accommodating the constituents to be mixed, FIGURE 2 is a corresponding view of the cartridge introduced into the inner end of the drill hole and not yet destroyed, and FIGURE 3 shows the condition produced after the cartridge has been destroyed.

In FIGURE 1 the reference numeral 1 designates a cylinder made of glass or equivalent material forming the cartridge and advantageously slightly rounded at the front end, the length of the cylinder being determined according to the length of the zone or part of the anchor bolt which is to be cemented in, i.e., it depends on the desired holding action. In the case of an anchor bolt employed for lining or support purposes in mines, the length of the anchor bolt is, for example, 0.4 to 1.0 metre.

Assuming, by way of example, the use of an inorganic mortar, the cylinder 1 is filled with the dry mortar 2 which, for instance, preferably consists of one part by weight of Portland cement Z475 and two parts by weight of sand having a grain size of from 0 to 2 mm. In this mortar there is embedded a capsule consisting of a material of the same nature as that of the cartridge 1, said capsule containing the mixing water and the rapid-hardening agent dissolved therein. The proportion of water is so chosen that on the mixing of the two constituents with one another a mortar of the consistency of moist earth with a hydraulic cement factor of less than 0.40 is obtained. In this way rapid hardening and substantially greater strength of the concrete are automatically achieved.

The opening 4 of the cartridge, which faces the outer end of the drill hole is hermetically sealed after filling said cartridge, which as already remarked above is advantageously carried out in the factory, so that the cartridge can be stored indefinitely. On the end of the cartridge there is mounted a sealing element 5 made, for example, of sponge rubber or equivalent material, which can be compressed by 30 to 80% of its volume and bears in yieldingly elastic fashion against the wall of the drill hole.

FIGURE 2 shows the cartridge pushed into the inner end of the drill hole as far as possible by means of a rammer bar, the cartridge being secured against slipping back by the packing or sealing element 5.

After the cartridge has been introduced (FIGURE 3) the anchor bolt 7, which is formed at least at its forward end with continuous or, if required, discontinuous spiral ribs 8, is driven into the cartridge simultaneously rotating in the direction opposite to that of the spiral ribs formed on it, through the central aperture in the seal 5, thereby destroying and disintegrating first the cover 4 and then the entire wall of the cartridge, the central hole in the sealing element 5 being simultaneously enlarged to the diameter of the anchor bolt whereby sealing of the periphery of the sealing element against the wall of the drill hole over a large area is obtained, as can be seen clearly in FIGURE 3.

The dry mortar, the mixing water and the hardening agent dissolved therein are thereby intensively mixed and as the mixture is conveyed towards the inner end of the drill hole the pressure required for filling in all the hollow spaces is exerted owing to the action of the spiral ribs.

The entire operation requires not more than 15 to 30 seconds, depending from the speed at which the anchor bolt is rotating.

Under difficult conditions it may prove to be advantageous, in addition to using the seal 5, to provide means to prevent the anchor bolt slipping out of the drill hole, which might perhaps otherwise be possible before the mass of the cement mortar or the synthetic resin material hardens. For this purpose a retaining wedge may be driven between the anchor bolt and the wall of the drill hole at the outer end of the latter.

The invention is not limited to the methods of carrying it into effect described herein in detail, in particular the joint use of all its features. Thus, particularly in cases in which there is no necessity of timely independence of the use of the hardenable mixture and of the introduction of the anchor bolt, prepared mixtures of the constituents of the synthetic resin, in particular mixtures having a high proportion of filler and thereby a doughy consistency, may be introduced into the drill hole in a cartridge not comprising separate compartments which is subsequently destroyed forcing its contents into the existing hollow spaces owing to the pressure effect occurring during driving in of the anchor bolt.

We claim:

1. A method of fixing an anchor bolt having radially extending ribs thereon in a drill hole by a hardened reaction product of at least two constituents comprising the steps of introducing the constituents into the drill hole in separate frangible cartridges, one of said cartridges containing a hardenable reaction constituent and another of said cartridges containing a hardening agent for the hardenable reaction constituent, *selecting an anchor bolt having radially extending ribs which terminate short of the walls of the drill hole, inserting* [driving] the anchor bolt into the drill hole *with sufficient force* to fracture said cartridges by contact therewith and thereafter to intermix the contents thereof by rotational movement of the anchor bolt, the anchor bolt being of sufficient size relative to the drill hole to effect the forcing of the mixed constituents into any crevices in the wall of the drill hole, and allowing the mixed constituents to harden to securely fix the anchor bolt in the drill hole.

2. A method as defined in claim 1 wherein said hardened reaction product is a synthetic resin selected from the group consisting of polyester resins, phenolic resins, melamine resins, polyurethane resins and epoxy resins.

3. A method as defined in claim 1 wherein the contents of one of said cartridges is a dry mortar.

4. A method as defined in claim 2 wherein at least one of the containers includes a gas-forming substance selected from the group consisting of ammonium carbonate, ammonium bicarbonate, azoisobutyric nitrite and terephthalic nitrosomethylamide.

5. A method as defined in claim 2 wherein the synthetic resin includes an inert filler in proportions of the order of 50 to 80% of the total substance.

References Cited by the Examiner

The following references, cited by the Examiner, are of record in the patented file of this patent or the original patent.

UNITED STATES PATENTS

| | | |
|---|---|---|
| 2,577,279 | 12/51 | Simon. |
| 2,714,974 | 8/55 | Sawyer. |
| 2,829,502 | 4/58 | Dempsey. |
| 2,849,866 | 9/58 | Flygare et al. |
| 2,864,492 | 12/58 | Lappala. |
| 2,907,173 | 10/59 | Robbins. |
| 2,930,199 | 3/60 | Jarund. |
| 2,952,129 | 9/60 | Dempsey. |

OTHER REFERENCES

Epoxy Resins, by Lee and Neville, pages 206, 210, published by McGraw-Hill Co., New York, 1957.

Cementation of Bituminous Coal Mine Roof Strata, by Maize et al. (Report of Investigations 5439), published by Bureau of Mines, United States Department of the Interior, 1959.

CHARLES E. O'CONNELL, *Primary Examiner.*